A. WIJNBERG & J. N. A. SAUER.
PROCESS FOR THE MANUFACTURING OF RAFFINADE (WHITE SUGAR) DIRECT FROM RAW SUGAR JUICES.
APPLICATION FILED OCT. 23, 1911.
1,070,654.
Patented Aug. 19, 1913.
2 SHEETS—SHEET 1.
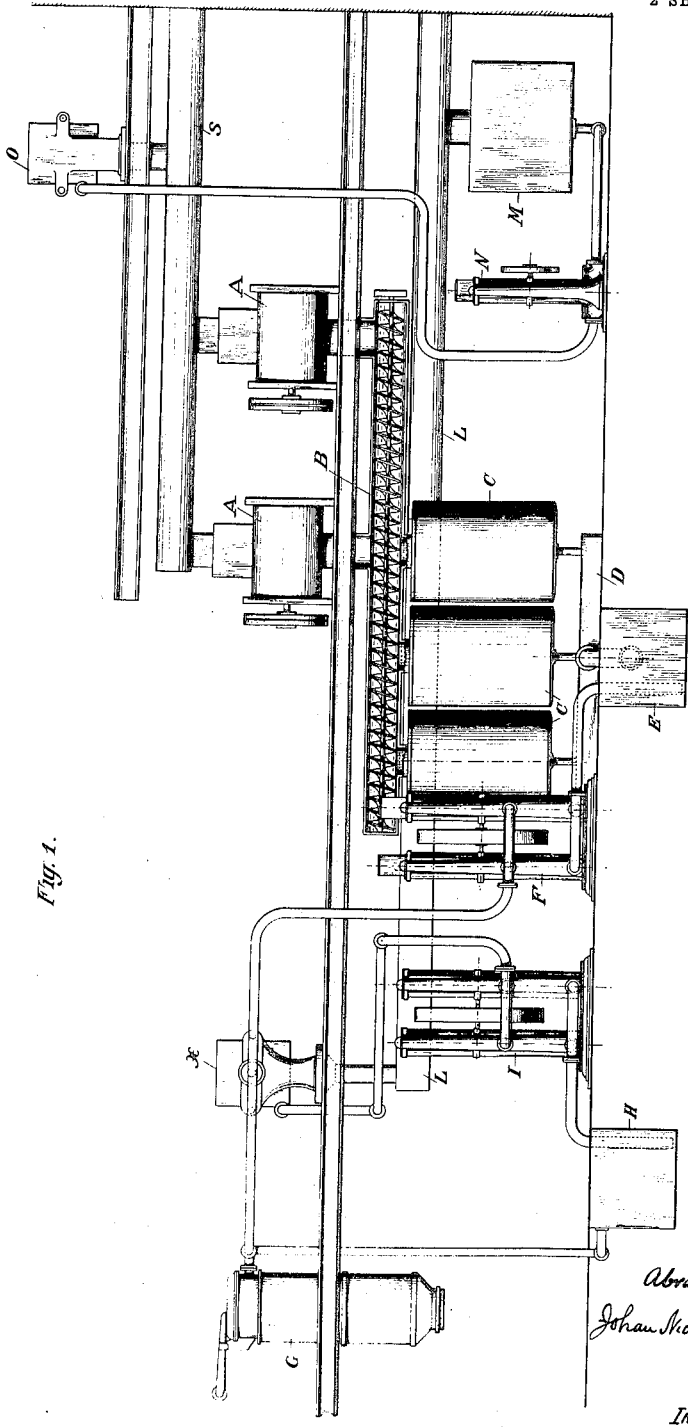

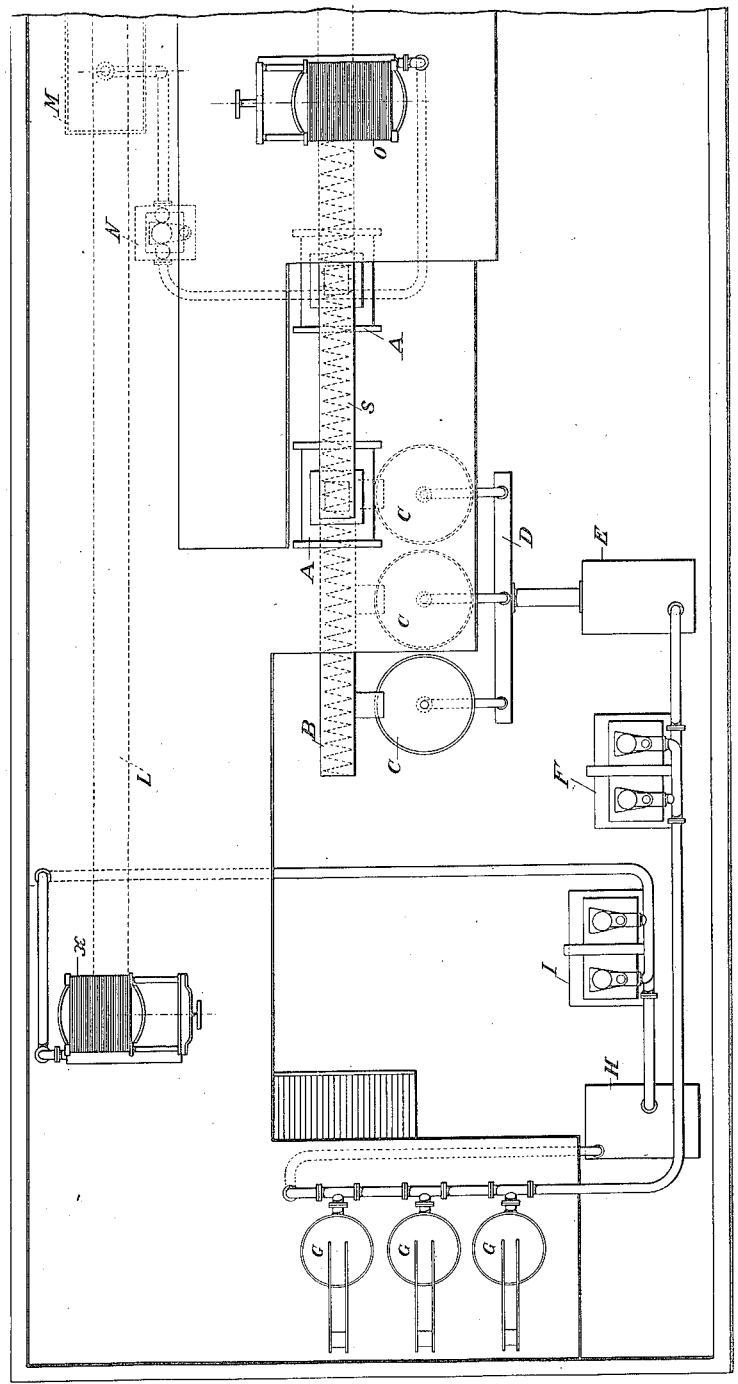

UNITED STATES PATENT OFFICE.

ABRAHAM WIJNBERG AND JOHAN NICOLAAS ADOLPH SAUER, OF AMSTERDAM, NETHERLANDS.

PROCESS FOR THE MANUFACTURING OF RAFFINADE (WHITE SUGAR) DIRECT FROM RAW SUGAR-JUICES.

1,070,654.

Specification of Letters Patent.

Patented Aug. 19, 1913.

Application filed October 23, 1911. Serial No. 656,239.

*To all whom it may concern:*

Be it known that we, ABRAHAM WIJNBERG, diplomated technologist and teacher at the School for Sugar Industry in Amsterdam, residing at 567 Heerengracht, Amsterdam, in the Kingdom of the Netherlands, and JOHAN NICOLAAS ADOLPH SAUER, engineer, residing at 30 Valeriusstraat, Amsterdam, in the Kingdom of the Netherlands, have invented certain new and useful Improvements in Processes for the Manufacturing of Raffinade (White Sugar) Direct from Raw Sugar-Juices, of which the following is a specification.

The present invention consists in a process by which white sugar, equal in quality and appearance to the refined sugar or raffinades manufactured in sugar refineries, can be produced directly from raw sugar juices. This result is obtained by treating the raw sugar juices with decolorizing carbon.

In the industrial treatment of raw sugar, decolorizing carbon has not hitherto been used because of its expense and the difficulty of regenerating it for repeated use, and because the particular conditions for its effective use were not known. We have discovered that the regeneration of the decolorizing carbon can be obtained by treating it with caustic alkalis or carbonates, or both, after which the decolorizing carbon is washed by any suitable means, as in a filter press. After this treatment, and in order to remove the last traces of alkali that may have been left in the decolorizing agent in the filter press, the mass is treated with acid to neutralize the alkali.

The decolorizing carbon for the treatment of the sugar juices may be used in any convenient form, the most effective and suitable form being as a powder or dust or in the form of a cake which is easily transformed into powder.

Decolorizing carbon is known in the trade under different designations, "noir épuré" or "eponit" or "norit", and the like, and is a product containing a high percentage, about 50% or more, of carbon. This decolorizing carbon powder or dust mixes intimately with the raw sugar juice and can easily be separated by filtration. Compared with bone black, this material possesses a decolorizing capacity about twenty times as effective as bone black.

We have discovered that in order to produce an effective decolorization, by means of the decolorizing carbon above referred to, it is essential that the raw sugar juice shall have a certain acidity.

The process is carried out as follows: The raw sugar juice, which has previously been treated by lime in the usual way, is saturated with sulfur dioxid ($SO_2$), to such a degree that the neutralization of 100 cc. of juice will require about 10 cc. $\frac{N}{10}$ alkali, although the acidity of the juice may, if desired, be varied from this proportion. To this juice so acidified, is added from 0.3 to 0.5% of decolorizing carbon and the mixture is boiled, preferably by injecting steam thereinto for quarter of an hour, more or less. The mass is then filtered, preferably in a filter press, whereby an absolutely colorless water-clear filtrate is obtained, which is then subjected to the usual treatment for producing white crystals or raffinades. The decolorizing carbon, after removal from the filter press, may be regenerated by boiling it in a solution of a caustic alkali or a carbonate thereof, or of both, preferably of about 10% strength. The alkali solution is then filtered off, the residue washed, treated with acid for removing the last traces of alkali, and again washed until a neutral action is obtained. The carbon thus regenerated is suitable for direct addition to raw sugar juices to again exercise its decolorizing action.

Sometimes the finely divided decolorizing carbon is carried through the filter press during filtration and causes a cloudiness in the sugar juice. This inconvenience may be obviated by adding to the decolorizing carbon, kieselguhr or other suitable material. The kieselguhr is employed by either mixing a suitable quantity of it with the decolorizing carbon before the filtration of the sugar juice, or after the color has been removed by means of the carbon, the sugar juice is mixed with kieselguhr and again filtered.

For carrying the process into practice, a plant is used, a diagrammatic view of which is illustrated in the annexed drawings, in which,—

Figure 1 represents the decolorizing plant in vertical section; and Fig. 2 is a horizontal section of the same.

A, A, are mixing drums for mixing the decolorizing carbon with water or with sugar juice, the mixture being conveyed by means of conveyers B, to the mixing vessels C, C. In these mixing vessels, the decolorizing of the raw sugar juice is partly effected; the mixed mass, so produced, consisting of sugar juice, and decolorizing carbon is delivered through pipe D to the collecting vessel E, and thence by means of pumps into the heaters G, for the purpose of keeping the juice at the necessary temperature and obtaining a most intimate action of the carbon on the juice. From the heaters G, the sugar juice, still mixed with and containing the decolorizing carbon, is delivered into the collecting vessel H, wherefrom, by means of pumps J, it is forced into the filter press batteries X, from which the decolorized juice is delivered for further treatment. The decolorizing carbon is removed from the filter press and delivered by means of conveyers L to the mixing vessel M, in which the filter mass is boiled with caustic alkali or alkaline carbonate to regenerate it. The mass is then, by means of pumps N, delivered to the filter O in which the liquid is removed, and it is then washed and delivered by means of conveyers S in a continuous cyclic process into mixing drum A, while the alkalis are carried off.

What we claim is:—

1. The process of refining raw sugar juices, which consists in slightly acidifying such juices and then subjecting them to the action of decolorizing carbon.

2. The process of refining raw sugar juices, which consists in acidifying such juices with about one per cent. of normal acid, mixing the said juices with decolorizing carbon and filtering to separate the decolorized juices from the decolorizing carbon.

3. The process of refining raw sugar juices, which consists in acidifying such juices, with about one per cent. of normal acid, mixing the said juices with decolorizing carbon, heating the mixture, and then filtering to separate the decolorized juices from the decolorizing carbon.

4. The process of refining raw sugar juices, which consists in acidifying such juices with about one per cent. of normal acid, mixing the said juices with decolorizing carbon and kieselguhr, and filtering to separate the decolorized juices from the decolorizing carbon.

5. The process of refining raw sugar juices, which consists in acidifying said juices with about one per cent. of normal acid, subjecting the same to the action of decolorizing carbon and kieselguhr, and separating the decolorized juices.

6. The process of refining raw sugar juices, which consists in acidifying such juices with about one per cent. of normal sulfur dioxid and then subjecting them to the action of decolorizing carbon.

7. The process of refining sugar juices, which consists in acidifying such juices with about one per cent. of normal sulfur dioxid, mixing the said juices with decolorizing carbon and filtering to separate the decolorized juices from the decolorizing carbon.

8. The process of refining raw sugar juices, which consists in acidifying such juices with about one per cent. of normal sulfur dioxid, mixing the said juices with decolorizing carbon, heating the mixture, and then filtering to separate the decolorized juices from the decolorizing carbon.

9. The process of refining raw sugar juices, which consists in acidifying such juices with about one per cent. of normal sulfur dioxid, mixing the said juices with decolorizing carbon and kieselguhr, and filtering to separate the decolorized juices from the decolorizing carbon.

10. The process of refining raw sugar juices, which consists in acidifying said juices with about one per cent. of normal sulfur dioxid, subjecting the same to the action of decolorizing carbon and kieselguhr, and separating the decolorized juice.

In testimony whereof we affix our signatures in presence of two witnesses.

ABRAHAM WIJNBERG.
JOHAN NICOLAAS ADOLPH SAUER.

Witnesses:
J. W. HILLSHOFF,
D. P. DEYOUNG.